United States Patent [19]

Jessup

[11] Patent Number: 4,614,902
[45] Date of Patent: Sep. 30, 1986

[54] CLOSURE RETENTION APPARATUS FOR AUTOMATIC DOORS

[76] Inventor: Frank L. Jessup, 8150 20th Ct., Sunrise, Fla. 33322

[21] Appl. No.: 705,624

[22] Filed: Feb. 26, 1985

[51] Int. Cl.[4] .......................... H02P 7/06; H02P 1/22
[52] U.S. Cl. .................................. 318/282; 318/286; 318/436
[58] Field of Search ............... 318/282, 283, 284, 285, 318/286, 440, 441, 442, 436, 266

[56] References Cited

U.S. PATENT DOCUMENTS

| 3,551,770 | 12/1970 | Isaacs | 318/283 X |
| 3,893,012 | 7/1975 | Lin | 318/442 X |
| 3,969,658 | 7/1976 | Htsui | 318/282 X |
| 4,289,995 | 9/1981 | Sorber et al. | 318/282 X |
| 4,471,274 | 9/1984 | Ross et al. | 318/282 |
| 4,476,416 | 10/1984 | Licata et al. | 318/283 |

Primary Examiner—William M. Shoop, Jr.
Assistant Examiner—Bentsu Ro
Attorney, Agent, or Firm—Pearne, Gordon, Sessions, McCoy, Granger, & Tilberry

[57] ABSTRACT

This invention relates to closure retention apparatus for automatic doors, and more particularly to an electrical circuit for providing a reduced amount of electrical power to the motor which controls the opening and closing of the door. The circuitry includes first circuit means for applying a first level of power temporarily to said motor for operating the door from open toward closed position, and a second circuit for applying a second, reduced level of power continuously to the application of the first level power thereto for a preselected period of time for operating said door toward closed position also.

6 Claims, 2 Drawing Figures

CLOSURE RETENTION APPARATUS FOR AUTOMATIC DOORS

SUMMARY OF THE INVENTION

This invention relates to controls for automatic doors, such as sliding doors, and more particularly to apparatus for preventing doors from falling open once they are closed.

A power operated sliding door has the problem known as "fallback". This is a condition that occurs once the door has been fully closed after the power has been removed from the operating motor. The door can, under certain conditions, such as wind, vibration, or spring action of the weather-sealing material, open a small amount. This small opening can not only be unsightly but result in a loss of thermal energy.

The present invention has for its object the retaining of the door in the closed condition, or otherwise, the door snugged against the jamb after closure, by providing a reduced, predetermined amount of electrical power to the motor that operates the door. This results in the motor being energized to the extent that prevents the door from falling back open. This small amount of electrical power according to the present invention is provided by means of a circuit sometimes referred to hereinafter as an "anti-fallback circuit".

Typical power door actuating circuits and apparatus to which this invention may be adapted are disclosed in U.S. Pat. Nos. 4,206,390; 4,216,717 and 4,440,428.

BRIEF DESCRIPTION OF THE DRAWINGS

The abovementioned and other features and objects of this invention and the manner of attaining them will become more apparent and the invention itself will be best understood by reference to the following description of an embodiment of the invention taken in conjunction with the accompanying drawings wherein.

DESCRIPTION OF A PREFERRED EMBODIMENT

Figure 1:
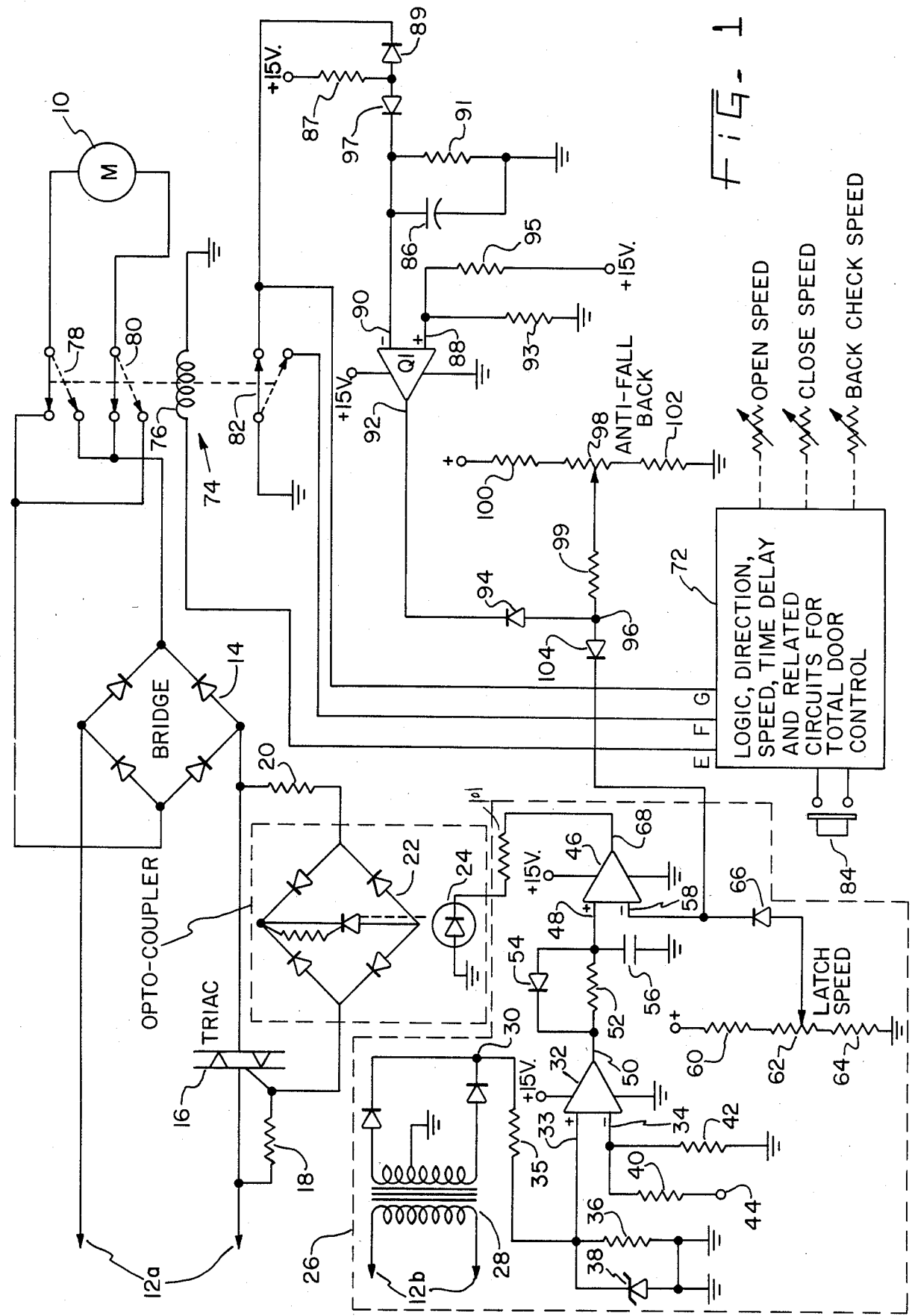
FIG. 1 is a schematic diagram of an embodiment of the present invention.

Referring to the drawings, a permanent magnet, direct current, reversible motor 10 is conventional and serves as the motor for opening and closing selectively the automatic door, which for purposes of illustration, is considered to be a conventional sliding door. By reversing polarity of the applied direct current voltage, the motor 10 can be reversed. Conventional control circuitry determines both the magnitude and the polarity of the voltage applied to the motor 10. This circuitry, for example, must be able to apply a relatively high voltage while closing the door, and upon reaching the last small percentage, for example ten percent, of door travel, a smaller voltage is applied to allow the door to travel slowly full closure. The door-closing apparatus to which the present invention is applied functions in this manner; however, after a brief period of time following initial door closure actuation to apply a relatively small voltage, be referred to as an "anti-fallback" voltage, which is continuously applied to the operating motor for sometimes preventing the door from sliding or falling back. The magnitude of this "anti-fallback" voltage is sufficiently small to present no threat to the motor when applied continuously.

Electrical power is derived from the stand one hundred twenty (120) volt alternating current mains indicated by the numerals 12a and 12b, these two different sets of mains being electrically identical and in-phase. The alternating current power applied to the terminals 12a is rectified by bridge 14 and is controlled by the triac 16. This triac 16 is commutated by a conventional circuitry commonly used in power control systems. In this invention, the triac 16 is controlled by the silicon controlled rectifier portion of a conventional photo-coupler 22 such as a type 4N40. Resistor 18 prevents false triggering of the triac 16, and resistor 20 protects the coupler 22 from inrush surges. The light-emitting diode portion 24 of the photo-coupler 22 receives phase related firing commands from a logic circuit which in illustrating the present invention is in the form of a "latch speed" control circuit indicated generally by the numeral 26.

Figure 2:
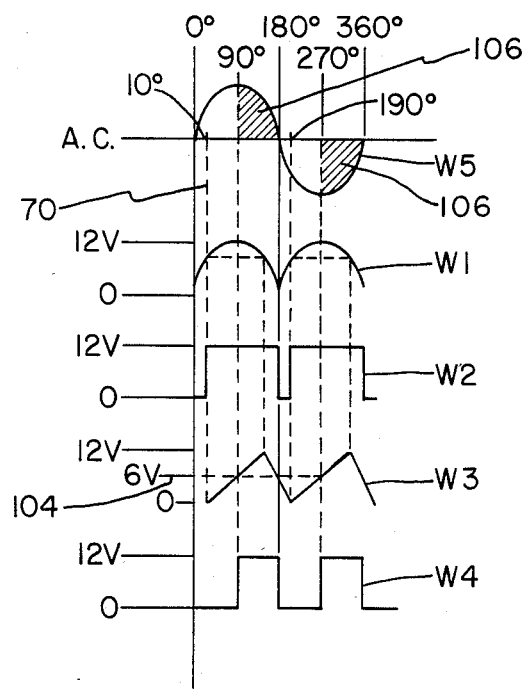
FIG. 2 illustrates waveforms useful in explaining the operation of the circuitry of FIG. 1.

This circuit 26 includes a transformer 28 having diodes in the secondary as shown to provide at junction 30 pulsed direct current voltage as depicted by waveform "W1" of FIG. 2. Each lobe of the waveform "W1" corresponds to each half cycle of the waveform "W5" which depicts the form of the alternating current voltage applied to the terminals 12a and 12b. A conventional operational amplifier or voltage comparator 32 has its non-inverting input terminal connected to the junction 30 via a voltage divider consisting of two resistors 35 and 36 as shown. A zener diode 38 is connected in shunt with the resistor 36 for the purpose of transient suppression.

The inverting terminal 34 of the voltage comparator 32 is also connected to a voltage divider consisting of the two resistors 40 and 42, a fifteen volt direct current source being connected to terminal 44 and the opposite end of the voltage divider circuit being grounded. The voltage applied to the voltage comparator 32 at terminal 44 is set to a value of about one-half volt for the working embodiment of the invention disclosed.

A second voltage comparator 46 like the first comparator 32 has its non-inverting terminal 48 connected to the output terminal 50 of comparator 32 by means of a resistor 52 which has connected thereacross a diode 54. A charging capacitor 56 is connected between the non-inverting terminal 48 and ground, as shown.

To the inverting terminal 58 of the comparator 46 is connected a source of threshold voltage in the form of a voltage divider consisting of the three resistors 60, 62 and 64 which are in series between a source of fifteen volts direct current and ground. The resistor 62 is variable with the movable tap being connected to the inverting terminal 58 by means of a diode 66.

The output terminal 68 of the comparator 46 is connected in series with the light emitting diode portion 24 of the photocoupler 22, previously described.

As stated previously, the voltage divider 40, 42 is set to provide about one-half volt threshold voltage to the inverting terminal of the comparator 32. The variable resistor 62 is set to also provide a threshold voltage on the inverting terminal 58 of the comparator 46, a voltage of about one-half volt. Thus, for both comparators 32 and 46 whenever the voltages on the non-inverting terminals are shifted from below to above the threshold voltage on the respective inverting terminals, the states of the comparators will be changed. For example, for the values of the resistors 35 and 36 selected for the working embodiment shown, the voltage provided at the non-inverting terminal 33 is selected to be about ten volts. With this voltage being above the one-half volt on the inverting terminal 34, the comparator 32 will change state to logic high in the output circuit 50. However, the form of the voltage applied to the non-inverting terminal 33 is as shown in FIG. 2 by the waveform "W1" which is pulsating varying from zero to maximum and back to zero. Thus, during the early portion of this wave-form, the voltage will be at a value less than one-half during which period the comparator 32 will remain in its "low" state. Once the voltage exceeds one-half volt on the non-inverting terminal 33, the comparator 32 will trigger to its alternate state to provide a logic high at the output terminal 50. A signal will, therefore, be developed at the output terminal 50 in square wave-form as shown in FIG. 2 by the waveform "W2".

This signal "W2" is applied to the charging capacitor 56 causing it to charge and discharge according to the sawtooth form of "W3". This sawtooth wave-form applied to the terminal 48 of comparator 46 produces at the output terminal 68 a signal having a phase relationship and shape as depicted by the waveform "W4". It is this waveform "W4", illustrated as voltage pulses, which is utilized to energize the light-emitting diode 24. In other words, the light-emitting diode 24 is turned on during the peak portions of the voltage pulses "W4" and is deenergized during the zero-level portions thereof. The waveforms "W1" through "W5" of FIG. 2 are all shown in typical phase relationship, with the exception that the illustrated phase of waveform "W4" in relation to the sawtooth "W3" corresponds to that to be explained later with reference to the "anti-fallback" feature of this invention. Without the anti-fallback feature being effective, the pulses of the waveform "W4" will begin at the phase angle denoted by the numeral 70 which corresponds to that angle at which the sine wave "W5" and the pulsating direct current wave "W1" reach a value of one-half volt which is equal to the threshold voltage applied to the inverting terminals on both the comparators 32 and 46. Thus, with respect to the effective period of latch speed circuit 26, the output signal that appears on the output terminal 68 of comparator 46 normally is a square wave which starts at the time of the phase angle 70 and terminates as shown. In other words, the pulses of the waveform "W4" will be of longer duration than those shown.

Conventional control circuitry for normal operation of the automatic door not forming a part of this invention, is indicated by the block 72. Signals generated by the circuitry 72 are used to energize and de-energize a relay indicated generally by the numeral 74. This relay 74 has a coil 76 and three single pole single throw switches respectfully indicated by the numerals 78, 80 and 82. For one condition of operation, the relay has the various switches operated to those shown by the solid line arrows and for the opposite condition by the dashed line arrows. The solid line arrows show the switches moved to the position for door-closing condition while the dashed line arrows depict the positions for door-opening conditions. The two switches 78, 80 when actuated apply opposite polarity power to the operating motor 10.

For purposes of explaining this invention, it will be assumed that the logic circuits 72 have developed an energizing voltage for the relay coil 76 causing the switches 78, 80 and 82 to be operated to the dashed line position. In these positions, the door control circuitry will apply a door-opening voltage to the operating motor 10 which will result in the door being opened and held opened.

If an open command is applied to the logic circuit 72, by closing the contacts of a manually operated switch 84, causing relay 74 to shift its contacts in a direction to apply the correct polarity voltage to the motor 10. The motor 10 will now operate appropriately and the door will open. While the door is in the open mode, relay 74 is energized by a voltage received from the logic network 72, and relay contacts 82 are positioned as shown in the dashed lines. In this position, capacitor 86 is charged to approximately thirteen volts via diode 97 and resistor 87 from fifteen volt direct current power source. Conventionally, a control such as the one of this invention will supply direct current voltages such as twenty-four (24) and fifteen (15) volts as required. Resistors 93 and 95 form a voltage divider that provides a reference voltage of about one-half volt at the non-inverting input terminal 88 of voltage comparator Q1. Q1 can be a standard type 741 operational amplifier. Since the voltage at charging capacitor 86 acts on inverting input terminal 90 and exceeds the value of the threshold voltage applied to the non-inverting input terminal 88, the output state of the voltage comparator "Q1" approaches ground. This output voltage appears on the output terminal 92 of the voltage comparator "Q1" which is connected by means of diode 94 to a circuit junction 96. This circuit junction 96 is coupled to the variable tap on a variable resistor 98 which forms a part of a voltage divider consisting of a series of resistors 98, 100 and 102, these resistors being connected across a fifteen volt direct current source. For purposes of this invention, the variable tap on the resistor 98 is set to provide a voltage of six volts at the junction 96. Since this junction 96 is connected by means of diode 104 to the inverting terminal 58 of voltage comparator 46, it will thus be seen that this comparator 46 has two threshold voltage sources connected to its inverting terminal 58, first the voltage from divider 60, 62, 64 and secondly from the voltage divider 98, 100, 102 just described.

With the voltage on the output terminal 92 of comparator "Q1" at or near ground, it will be seen that the voltage appearing at junction 96 will also be at ground. This essentially disables the circuit 98, 100, 102 from applying the six (6) volt threshold voltage to the inverting terminal 58 of comparator 46. At the time or during the condition the comparator "Q1" has its output terminal 92 at or near ground potential, the door may be considered to be open.

For door closing condition, the contacts of switch 84 are released thereby causing the logic network 72 to deenergize the relay 74. Contacts 82 will be moved to the solid-line position shown. Capacitor 86 will no longer receive voltage from the fifteen volt power source, because resistor 87 is grounded via diode 89 and switch 82. A door normally requires about four seconds to close. The relationship of capacitor 86 discharging through resistor 91 compared to the reference voltage established by resistors 93 and 95 provides a time duration of about twenty seconds before the output voltage of comparator "Q1" rises to about thirteen volts. It should be noted at this point that this time duration of twenty seconds is arbitrarily selected to be sufficiently long to assure closure of the door and may, for example, be some other value such as ten seconds or twenty-five seconds. At the end of the discharge, the potential applied to the inverting terminal 90 will become essentially zero or ground potential which is substantially lower than that applied to the non-inverting terminal 88 which was selected to be about one-half volt. In this event, the comparator "Q1" is triggered to logic high condition at which the voltage on terminal 92, which along with diode 94 forms part of an enable-disable circuit. This high voltage is blocked by the diode 94 thereby permitting the normal voltage appearing across the voltage divider 98, 100, 102 and especially that on the tap of the variable resistor 98 to appear at junction 96. This junction 96 voltage is then coupled to the inverting terminal 58 of comparator 46. It should be noted that the normal voltage appearing at junction 96 in this event is six volts which is much higher than the one-half volt developed by the voltage divider 60, 62, 64 and applied to the inverting terminal 58.

This six volts threshold voltage is also indicated in FIG. 2 by the numeral 104. The comparator 46 is maintained in "off" condition until the value of the sawtooth voltage applied to the terminal 48 rises to a level higher than six volts. When this occurs, the state of the comparator 46 shifts to provide the output voltage as previously described and illustrated as being waveform "W4". The same pulsating waveform "W4" is used to energize the light emitting diode 24 which in turn controls conductivity of the bridge portion 22 of the photocoupler. Because of the phase relationship between the pulses "W4" and the sine wave "W5" of the applied power, the bridge 22 will couple through only those portions of the sine wave "W5" as are shaded, these being indicated by the numeral 106. The shaded portions 106 constitute a smaller portion of the power envelope applied to the operating motor 10 than was previously the case when the junction 96 was disabled during door opened condition and the threshold voltage of one-half volt was applied by the variable resistor 62.

Thus, the term "phase-firing" is used to distinguish between the conditions of commutating say, for example, of ninety percent of the sine wave of the applied voltage "W5" for closing the door and for only about one-half of such voltage as for the door closed condition as produced by the pulses "W4". The higher the voltage at junction 96, the later in the cycle of the applied power wave "W5" will the commutation occur. This of course results in reducing the direct current voltage applied to the motor 10. For the operating embodiment described, the resulting, door closure retention voltage applied to the operating motor 10 is about ten volts as compared with the normal latching speed voltage as determined by the latch speed control circuit 26 of about thirty volts.

Since the door will be assumed to be closed at the expiration of the twenty second period previously described and thus before the ten volts is applied, a relatively high voltage will be applied to the motor 10. However, at the end of the twenty second period, the door will be assumed closed and the voltage will drop to ten volts. It is this ten volts that will be sufficient to retain the door closed and prevent the fall-back condition previously explained.

Recapitulating, conventional door-closing systems provide a relatively high initial voltage to the motor 10 causing it to move rapidly from its open toward closed positions. When the door has reached a point near the end of its travel, a microswitch is tripped causing the voltage to be reduced to latch speed and the door movement to slow materially until it is closed. While the time of travel until closed is usually about four seconds, the twenty second period above-described will normally be adequate to assure door closure. The latch speed voltage of thirty volts thus will be applied for about sixteen seconds, before being reduced to the ten volts as explained, but this short duration of thirty volt application is not sufficient to cause motor damage. In the prior art, once door-closing parameters were accomplished, power was completely removed from the motor thereby permitting the door to fall back or open slightly. This invention provides a still further reduction in voltage after a predetermined time period for assuring door closure, this reduced voltage being applied continuously in just enough amplitude to prevent fall back.

For a working embodiment of the present invention, the various components and values as noted in the list following were used: however, it is to be understood that this invention is not limited thereto and that such components and values can vary depending upon design considerations involved.

| | |
|---|---|
| Photo-coupler 22, 24 | 4N40 |
| Resistor 34 | 10,000 ohms |
| Resistor 36 | 3,300 ohms |
| Resistor 40 | 20,000 ohms |
| Resistor 42 | 2,400 ohms |
| Resistor 52 | 56,000 ohms |
| Resistors 60, 87, 99 | 4,700 ohms |
| Resistors 62, 64, 98, 102 | 10,000 ohms |
| Resistor 91 | 300,000 ohms |
| Resistor 93 | 2,700 ohms |
| Resistor 95 | 100,000 ohms |
| Resistor 100, 101 | 1,000 ohms |
| Capacitor 56 | 0.1 MFD |
| Capacitor 86 | 10 MFD |
| Comparators 32, 46 and Q1 | Type 741 |

While there have been described above the principles of this invention in connection with specific apparatus, it is to be clearly understood that this description is made only by way of example and not as a limitation to the scope of the invention.

What is claimed is:

1. Closure retention apparatus for automatic doors comprising:
    a direct current, reversible, door-operating motor operable to change direction upon reversal of the polarity of energized voltage,
    first circuit means for applying a first level of power temporarily for a predetermined period of time to said motor for operating the door from open toward closed position, said first circuit means including a power supply coupled to said motor which converts alternating current power to direct current power, said power supply including a first source of alternating current voltage and a rectifier having alternating current input and direct current output circuits, the output circuit being coupled to said motor, said circuit means further including a phase-firing network connected in the input circuit of said power supply for controlling the phase of the alternating current power applied to said rectifier between full cycle and partial cycle conditions, and a phase control circuit for generating a first phase-firing signal for providing said first level of power for said motor, and
    second circuit means for applying a second level of power continuously to said motor after application of said first level of power to said motor and at the end of said period of time.

2. The apparatus of claim 1 wherein said second circuit means includes a timing circuit for limiting the application of said first level of power to said motor for said period of time, said timing circuit including a capacitor and means for charging it prior to the initiation of said period and for discharging it at the end thereof.

3. The apparatus of claim 2 wherein said phase-firing network is a photo-coupler in series with said input circuit, said phase control circuit having input and output circuits, said photo-coupler including a light emitting diode in said phase control output circuit which is energizeable by said first phase-firing signal.

4. The apparatus of claim 3 wherein said phase control circuit includes a two-state voltage comparator having first and second voltage comparison input circuits and said phase control output circuit, means for applying to the first comparison input circuit a signal corresponding to the phase changes in a half cycle of the aforesaid alternating voltage, and a second source of direct current threshold voltage coupled to said second input comparison circuit whereby said voltage comparator changes states when the voltage of said phase signal as applied to said first comparison input circuit changes between values thereabove and below, said comparator generating first and second phasing voltages in said phase control output circuit in response to the change in state thereof, said light emitting diode being energized by said first phasing voltage and deenergized by said second phasing voltage.

5. The apparatus of claim 4 wherein said second circuit means includes a third source of threshold voltage of different value than said first threshold voltage and coupled to said second input comparison circuit, and a second two-state voltage comparator having third and fourth voltage comparison input circuits and an enable-disable output circuit, a fourth source of threshold voltage connected to the third input circuit, said charging capacitor being connected to said fourth input circuit, said second circuit means further including circuitry connecting said enable-disable output circuit to said third source of threshold voltage for coupling and decoupling, respectively, said third source voltage to said second input comparison circuit of the first-mentioned comparator in response to the changed state of said second voltage comparator.

6. The apparatus of claim 5 wherein said second circuit means includes a switching circuit selectively controllable to cause charging and discharging, respectively, of said capacitor, and said second and third sources of threshold voltages being adjustable.

* * * * *